April 3, 1951 R. D. DODGE 2,547,449

PROPORTIONAL SPACING MECHANISM FOR TYPEWRITERS

Filed July 8, 1948 8 Sheets-Sheet 1

INVENTOR
R. D. DODGE
BY
ATTORNEY

April 3, 1951 R. D. DODGE 2,547,449

PROPORTIONAL SPACING MECHANISM FOR TYPEWRITERS

Filed July 8, 1948 8 Sheets-Sheet 2

INVENTOR
R. D. DODGE
BY
ATTORNEY

April 3, 1951 R. D. DODGE 2,547,449

PROPORTIONAL SPACING MECHANISM FOR TYPEWRITERS

Filed July 8, 1948 8 Sheets-Sheet 3

INVENTOR
R. D. DODGE
BY [signature]
ATTORNEY

April 3, 1951 R. D. DODGE 2,547,449
PROPORTIONAL SPACING MECHANISM FOR TYPEWRITERS
Filed July 8, 1948
8 Sheets-Sheet 4
FIG. 14
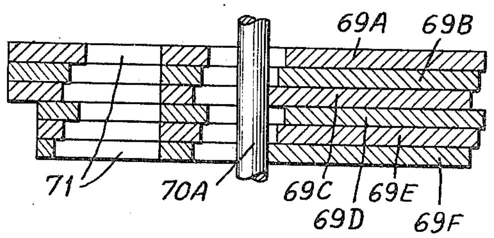
FIG. 24A FIG. 24B
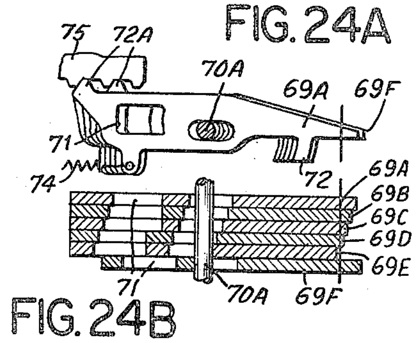
FIG. 25A
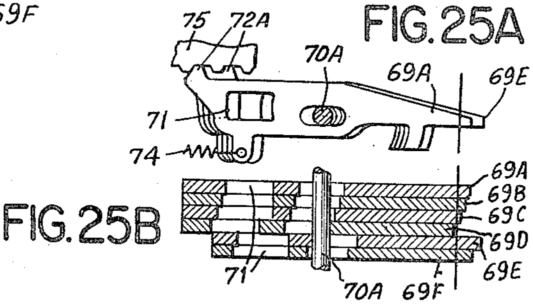
FIG. 25B
FIG. 13 FIG. 6
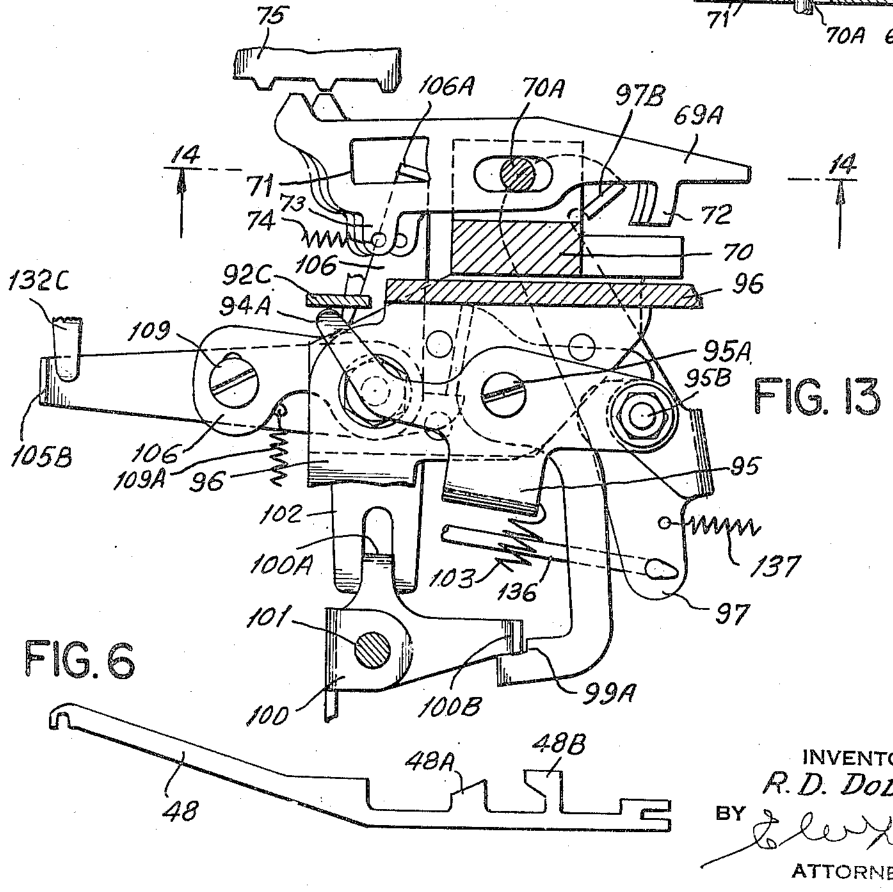
INVENTOR
R. D. DODGE
BY [signature]
ATTORNEY April 3, 1951 R. D. DODGE 2,547,449

PROPORTIONAL SPACING MECHANISM FOR TYPEWRITERS

Filed July 8, 1948 8 Sheets-Sheet 5

INVENTOR
R. D. DODGE
BY [signature]
ATTORNEY

INVENTOR
R. D. DODGE
BY [signature]
ATTORNEY

PROPORTIONAL SPACING MECHANISM FOR TYPEWRITERS
Filed July 8, 1948 8 Sheets-Sheet 7
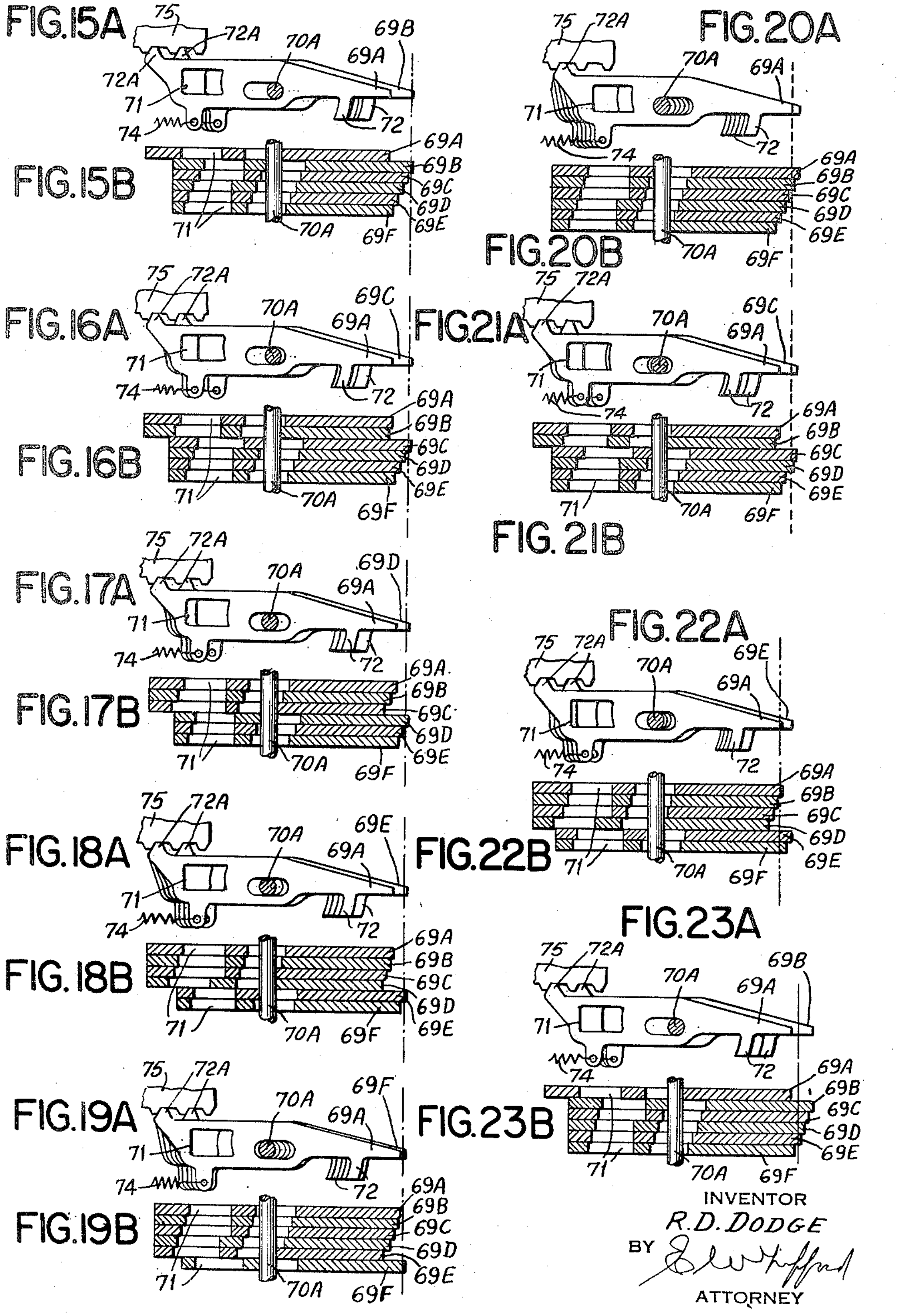
FIG. 15A, FIG. 15B, FIG. 16A, FIG. 16B, FIG. 17A, FIG. 17B, FIG. 18A, FIG. 18B, FIG. 19A, FIG. 19B, FIG. 20A, FIG. 20B, FIG. 21A, FIG. 21B, FIG. 22A, FIG. 22B, FIG. 23A, FIG. 23B
INVENTOR
R. D. DODGE
BY [signature]
ATTORNEY April 3, 1951 R. D. DODGE 2,547,449

PROPORTIONAL SPACING MECHANISM FOR TYPEWRITERS

Filed July 8, 1948 8 Sheets-Sheet 8

INVENTOR
R. D. DODGE
BY [signature]
ATTORNEY

Patented Apr. 3, 1951

2,547,449

UNITED STATES PATENT OFFICE 2,547,449

PROPORTIONAL SPACING MECHANISM FOR TYPEWRITERS

Ronald D. Dodge, Poughkeepsie, N. Y., assignor to International Business Machines Corporation, New York, N. Y., a corporation of New York Application July 8, 1948, Serial No. 37,578

46 Claims. (Cl. 197—84)

This invention relates to typewriting machines.

The primary object of the present invention is to provide an improved mechanism for spacing the characters printed by a typewriting machine in proportion to their widths.

An object is to provide a simple and compact variable spacing mechanism for typewriting machines.

Another object is to provide a variable spacing mechanism which is faster than the spacing mechanisms hitherto used in the art.

An object is to provide a variable spacing mechanism which takes up relatively little space yet is capable of a relatively large number of different degrees of spacing to accommodate considerable variation in the widths of the characters of a font of type used in a typewriting machine.

An object is to provide a variable spacing mechanism suitable for use in a typewriting machine equipped with the power mechanism disclosed in application Serial No. 752,723, filed June 5, 1947, and since issued as Patent No. 2,506,444, dated May 2, 1950, and the shift mechanism disclosed in application Serial No. 756,921, filed June 25, 1947, and since issued as Patent No. 2,517,989, dated August 8, 1950.

An object is to provide a variable spacing mechanism which offers the least interference with the location and operation of other mechanisms associated with the carriage of the typewriting machine, such as the back-spacing mechanism, tabulating mechanism, the margin controlling mechanism, and the carriage return mechanism.

An object is to provide a variable spacing mechanism which is more accurate and more reliable than the variable spacing mechanisms hitherto used in the art.

An object is to provide a variable spacing mechanism which occupies considerably less space in the machine than variable spacing mechanisms hitherto used in the art and avoids the use of extension housings which tended to increase the size of the typewriter.

An object is to provide a variable spacing mechanism which enables the use of an escapement rack having relatively large, coarse teeth while permitting exceedingly fine spacings of the carriage to be obtained thereby enabling the escapement rack to be made much stronger and eliminating the troubles which arise when it is attempted to use a fine pitched escapement rack.

An object is to provide a variable spacing mechanism in which certain undesirable conditions arising during the return of the carriage and during tabulating operations are eliminated to enable more accurate margins and columns to be obtained and to insure more accurate and more positive arresting of the carriage in the left-hand marginal position.

An object is to provide means for accurately and positively engaging the escapement pawls with the escapement rack at the end of the carriage return operations to eliminate uneven margins which commonly result when it is attempted to use fine pitched racks.

An object is to provide a variable spacing mechanism which permits returning the carriage and tabulating at a higher speed than was possible hitherto.

Other objects of the invention will be pointed out in the following description and claims and illustrated in the accompanying drawings, which disclose, by way of example, the principle of the invention and the best mode, which has been contemplated, of applying that principle.

In the drawings:

Fig. 6 is a detail view of one of the selector bars.

Fig. 13 is a view somewhat similar to Fig. 7, but showing the escapement pawls held in released position.

Fig. 14 is a vertical section on the line 14—14 in Fig. 13.

Figs. 15A to 19A are a series of large scale detail plan views showing a succession of positions which the escapement pawls take when they are operated to cause one unit of spacing of the carriage, the pawls being operated in succession from top to bottom, save for the topmost escapement pawl.

Figs. 15B to 19B are vertical sections corresponding to Figs. 15A to 19A and show the positions of the different pawls in relation to the mounting stud for said pawls.

Figs. 20A and 21A are views similar to Figs. 15A to 19A illustrating two successive positions of the escapement pawls when two units of spacing take place.

Figs. 20B and 21B are vertical sections corresponding to Figs. 20A and 21A, respectively.

Figs. 22A and 22B are a plan view and a vertical section, respectively, similar to Figs. 21A and 21B, but showing the selective operation of the pawls to determine three units of spacing.

Figs. 23A and 23B are similar to Figs. 21A and 21B but illustrate the selection for four units of spacing.

Figs. 24A, 25A, and 24B, 25B are figures similar to Figs. 21A and 21B, to illustrate operation of the spacing pawls to select five units of spacing.

Figures 26, 27, 28, 29:
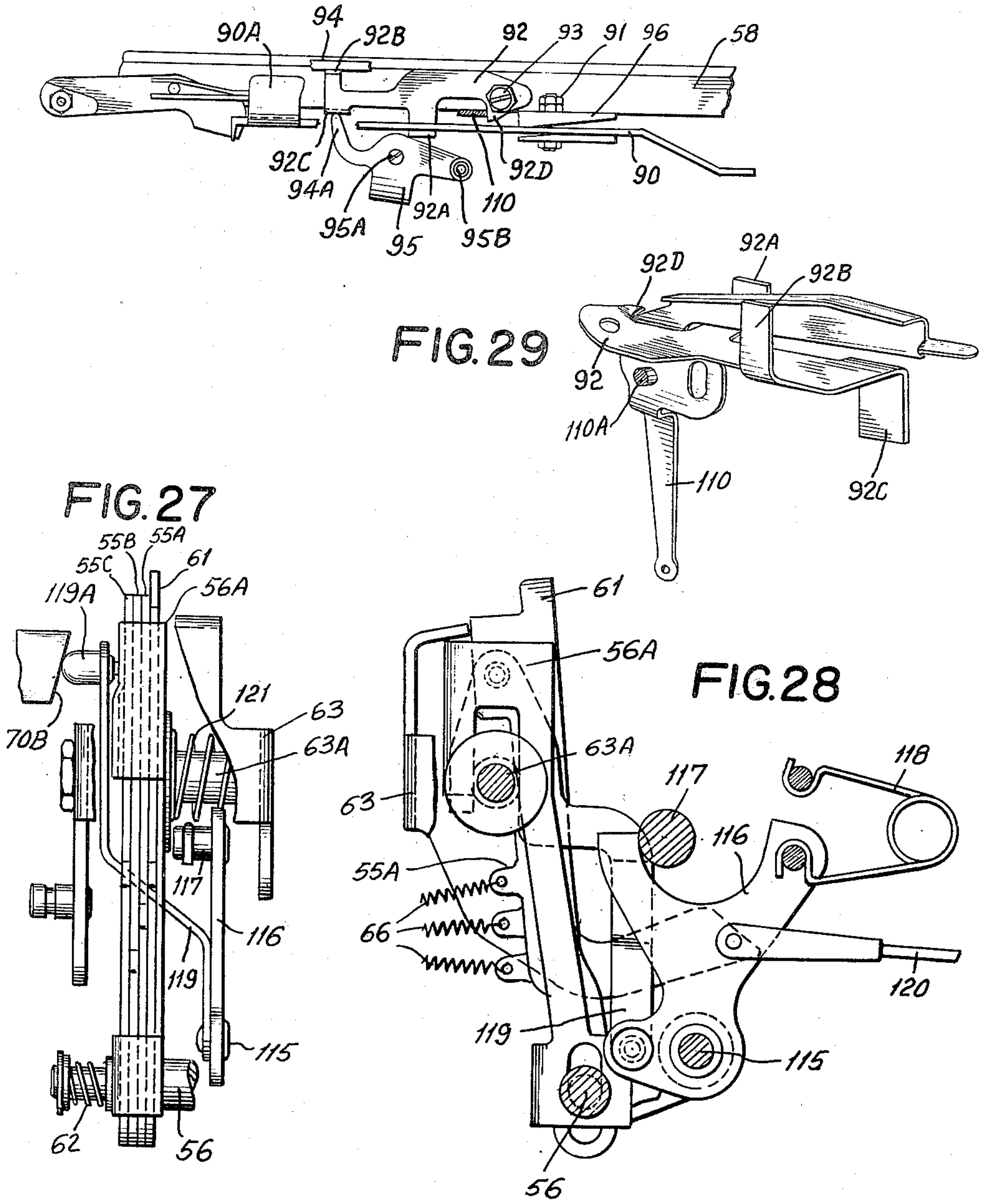

Fig. 26 is a plan view showing the connections for releasing the escapement mechanism from the carriage.

Fig. 27 is a large scale rear view of the means for expanding the spacing.

Fig. 28 is a side elevation of the mechanism shown in Fig. 27 with certain parts broken away.

Fig. 29 is a detail view of the carriage return release lever.

Figures 1, 5:
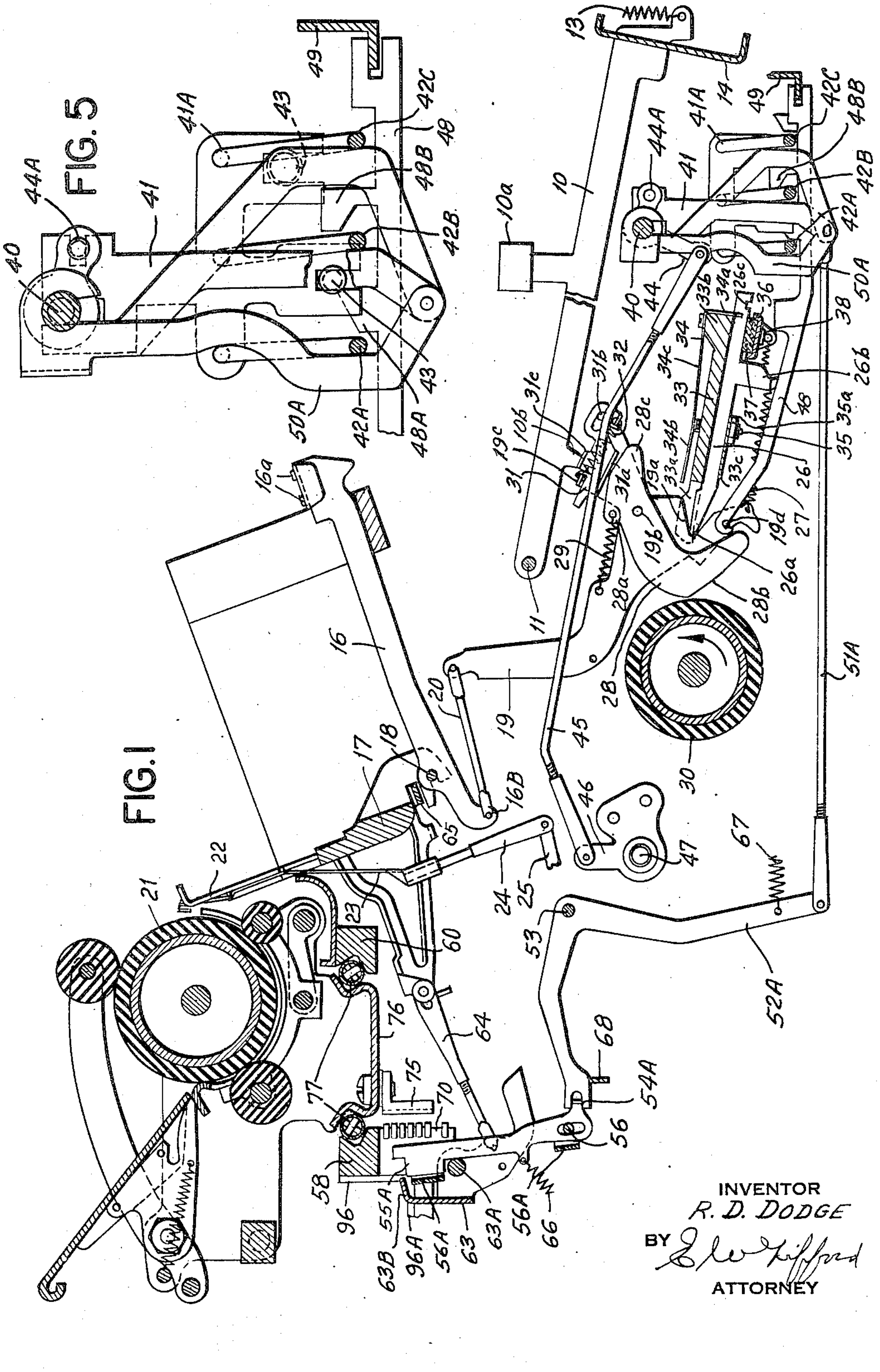
Fig. 1 is a vertical section of a typewriting machine incorporating the present invention.
Fig. 5 is a large scale vertical section on the line 5—5 in Fig. 2.

The numeral 10 designates one of the key levers of which there is one for each character printing type bar and is pivoted on a cross rod 11 suitably supported in the side frames 12 of the machine. Each key lever 10 is provided with a finger button 10A and a restoring spring 13 which urges the key lever 10 in a counterclockwise direction (Fig. 1). The forward or right-hand ends of the key levers 10 are guided in slots in a key guide bail 14 which is suitably mounted in the base 12.

Associated with each key lever 10 is a character printing type bar 16 which, as usual in the art, may be provided with two types 16*a* comprising upper and lower case characters. The type bars 16 are supported in a type basket which includes the usual segment 17 and the type bars 16 are pivoted in the segment 17 by the usual curved pivot wire 18. The segment 17 is slotted to accommodate the type bars 16 and, since the segment is curved, the type bars 16 recline at the angle shown in Fig. 1, but at different levels in the machine.

Each type bar 16 is operated by a power unit which includes a sub-lever 19 connected by a link 20 to an extension 16B formed in the associated type bar 16, whereby the rocking of the sub-lever 19 clockwise, through the link 20, actuates the type bars 16 in a counterclockwise direction to engage one or the other of the type characters 16*a* with the work sheet on the usual platen 21, the type striking through the usual ribbon. At the printing point the types are guided by a type guide 22 which is secured to the front face of the segment 17. The type guide 22 also slidably supports a ribbon vibrator 23 which is mounted on the upper end of a link 24 pivoted at its lower end to a lever 25 for actuating the ribbon vibrator. Any suitable means may be used for actuating the ribbon lever 25.

The lower end of each sub-lever 19 is formed with a deep notch 19*a* which cooperates with a fulcrum strip 26 having a rounded nose 26*a* and the nose 26*a* is kept seated in the notch 19*a* by means of a spring 27 which is anchored to the lower end of the sub-lever 19 below the notch 19*a* and to a lug 26*b* in the fulcrum strip 26. The spring 27 not only serves to hold the sub-lever 19 on the pivot or nose 26*a* but also tends to restore the sub-lever 19 when it has been actuated as hereafter described and incidentally assists in restoring the type bar 16 after it has made its impression.

Each power unit includes a somewhat L-shaped cam element 28 pivoted at 19*b* on the sub-lever 19. This cam 28 is provided with a restoring spring 29 which is anchored to an ear 28*a* formed in the cam 28 and to a lug struck from the lever 19. The cam 28 is provided with a spiral tread 28*b* designed to cooperate with the power roller 30 which rotates continually in the direction of the arrow (Fig. 1) while the machine is in use. Normally, however, the upper end of the tread 28*b* clears the power roller 30 with the parts shown in the position of Fig. 1 which is the normal position.

Each cam 28 has an elongated tail piece 28*c* which ordinarily is held in engagement with a lug 31*a* in the release member 31, the spring 29 in the position of Fig. 1 holding the tail piece 28C against the lug 31*a*. The release member 31 is provided with a slot through which passes a stud 31*b* carried by an arm forming part of the sub-lever 19. A spring 32, connected to an ear formed in the release member 31 just below and to the right of the stud 31*b* and to a lug 19*c* formed in the arm of lever 19 carrying stud 31*b* holds the member 31 with the stud 31*b* at the right-hand end of the slot in member 31 and also normally holds member 31 up against the lug 19*c*. The member 31 has a lug 31*c* which just clears a short extension or lug 10*b* in the character key 10.

When the character key 10 is depressed, the member 31 will be rocked slightly counterclockwise by the engagement of the lug 10*b* with the lug 31*c*. This rocks the cam 28 slightly clockwise sufficiently to bring the upper end of the tread 28*b* into engagement with the surface of the power roller 30. Thereafter, the power roller 30 drives the cam 28 in a clockwise direction and, due to the eccentric shape of the tread 28*b* on member 28, pushes the stud 19*b* to the right in a short arcuate path, thereby actuating the sub-lever 19 in a clockwise direction on pivot 26*a* and, through the link 20, operating the type bar 16 to effect an imprint from one of the types 16*a*.

Figure 2:
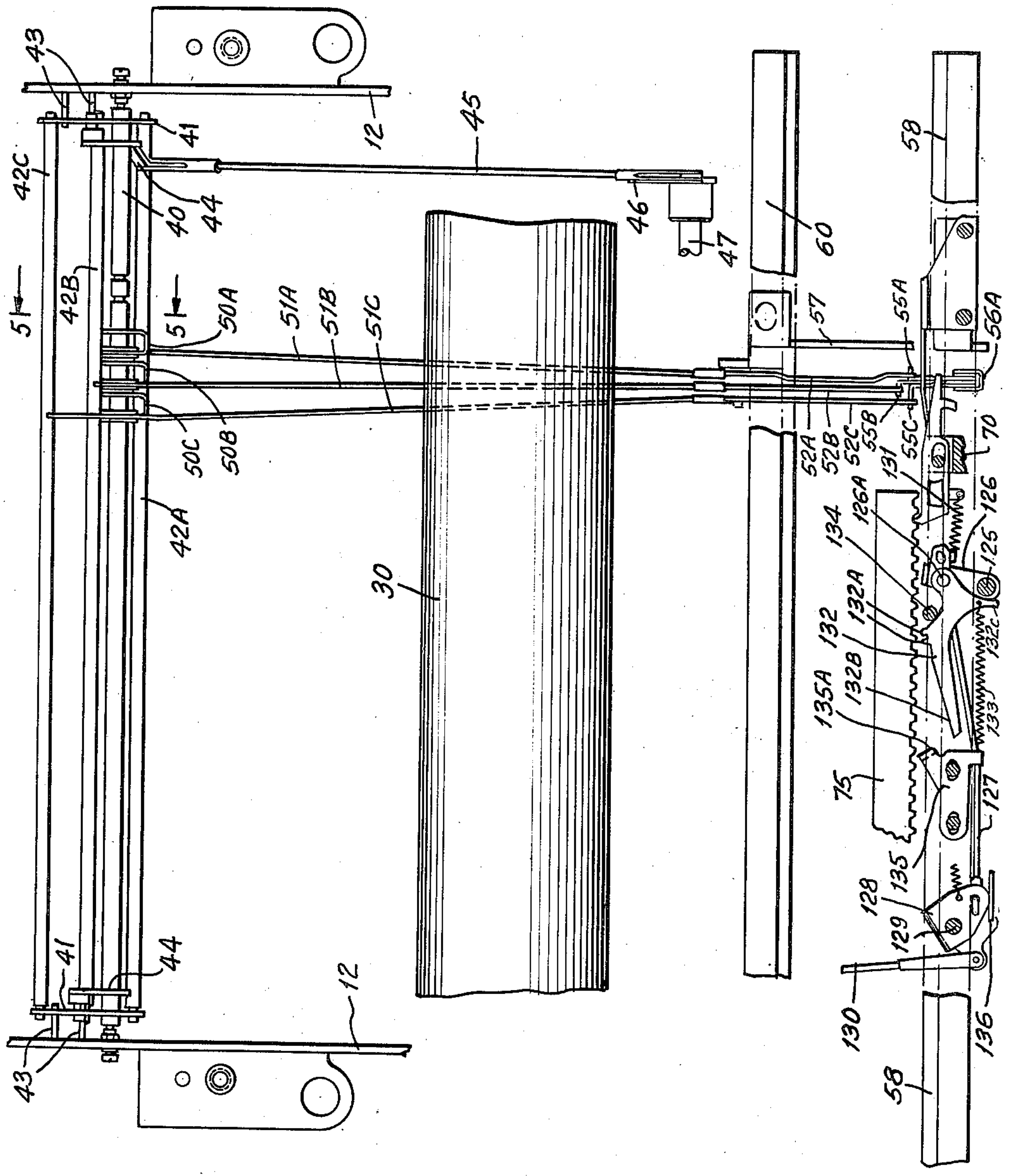
Fig. 2 is a plan view of the variable spacing mechanism and selector mechanism.

Before proceeding with the description of the variable spacing mechanism, the space selecting mechanism operated by the power mechanism for the type bars will be described first. This mechanism is shown in Figs. 1 and 2 and largely mounted underneath the keyboard just in front, that is, to the right in Fig. 1, of the power roller 30. A cross shaft 40 is journalled in the side frames 12 underneath the front ends of the keys 10 and adjacent the side frames 12 the shaft 40 is circumferentially grooved to vertically guide two support plates 41 in which are loosely pivotally supported the selector bails 42A, 42B, and 42C. Each bail consists of a round rod formed with cranks at its ends with the crank pins pivoted at 41A in the plate 41. The plates 41 are vertically guided at their lower ends by studs 43 carried by the side frames 12 so that the plates 41 are compelled to move vertically and linearly. Secured to the shaft 40 near its ends are two bell cranks 44 each of which has a pin 44A loose in a horizontal slot formed in one of the plates 41 and one of the bell cranks 44, the right-hand one (Fig. 2) is connected by a link 45 to a lever 46 mounted on the shaft 47 loosely journalled in the frames 12. The shaft 47 forms part of the shift mechanism disclosed in application Serial No. 756,921 and is rocked a limited extent clockwise (Fig. 1) each time type basket 17 is shifted downwardly to the upper case position. This causes both plates 41 to be elevated a limited extent thereby raising all of the bails 42A, 42B, and 42C. This provides for changing the space selections when upper case characters are printed as some of the upper case characters are wider than the lower case characters calling for increased spacing.

At this point it should be explained that a certain number of the characters in the font which may be employed require only two units of spacing and for this reason the spacing mechanism and the selector mechanism are so designed that normally the machine will space two units unless three, four, or five units are selected. Thus, for certain of the type bars 16, the selector bails 42A, 42B, and 42C will not be operated but the spacing mechanism will, nevertheless, be operated to effect two units of spacing.

For the purpose of operating the bails 42A, 42B, and 42C to select three, four, or five units of spacing, respectively, there is provided a series of selector bars like 48 (Fig. 1) which are pivoted at 19D to the sub-levers 19 whereby the bar 48 will be drawn to the left (Fig. 1) each time the corresponding type bar is operated in the manner explained above. The selector bars 48 are guided at their front or right-hand ends (Fig. 1) in a cross bar 49 so that their motion is substantially horizontal. These selector bars 48 are provided with various combinations of lugs like 48A and 48B, or none at all, adjacent the bails 42A, 42B, and 42C whereby the bails are rocked clockwise selectively.

The selector bar 48 in Fig. 6 is typical of a character which is to have three units of spacing in the lower case and four units of spacing in the upper case. Accordingly, the lug 48A is so shaped as to move the bail 42A to the left (Fig. 1) each time the bar 48 is operated whereas the lug 48B is so shaped as to move the bail 42B to the left when the plates 41 are elevated as is the case when the type basket is shifted to upper case position, but, under the last condition, the bail 42A will clear the lug 48A. Associated with each of the bails 42A, 42B, and 42C is an arm like 50A, which is associated with bail 42A, connected by a link 51A to a lever 52A journalled on a fixed pivot 53. With the bails 42B, 42C there is associated similar series of parts designated 50B, 51B, 52B, and 50C, 51C, and 52C, respectively, the letters A, B, and C being associated with the parts which effect the selections of three, four, or five units of spacing, respectively.

The levers 52 have forked connections 54A, 54B, and 54C (Figs. 1 and 2) to the interposers 55A, 55B, and 55C which are pivotally slidably mounted on a stud 56 carried by a bracket 57 partly supported by the rear carriage rail 58 and partly by the front carriage rail 60. The stud 56 also supports a fourth interposer 61, but this interposer is not vertically slidable on the pivot 56. The interposer 61, however, is pivoted on the stud 61 with a very loose fit so that its upper end may be swung to the left (Figs. 3 and 27) for a purpose to be made clear later. The interposers 55A, 55B, 55C, and 61 are mounted within a cage 56A, most clearly shown in Fig. 27, which keeps the interposers in intimate contact with each other while permitting them to slide vertically, with the exception of the interposer 61. This cage 56A is loosely mounted on the stud 56 so that the cage and the interposers 55A, 55B, 55C, and 61 all swing bodily on the pivot 56. The stud 56 has a shoulder which determines the vertical planes of movement of the interposers and the assembly including the cage is urged to the right (Figs. 3 and 27) on the reduced part of the stud, against the shoulder thereon, by means of a compression spring 62.

Pivotally mounted on the stud 63A carried by bracket 57 is a common operating member 63 which partly encloses the interposers 55A, 55B, 55C, and 61 and has a link connection 64 to the universal bar 65. This universal bar is pushed to the left (Fig. 1) each time a type bar is operated thereby rocking the common operating member 63 clockwise (Fig. 1) on its pivot 63A, this pivot also serving to limit counterclockwise swinging movement of the interposers 55A, 55B, 55C, and 61. These interposers are urged in a counterclockwise direction by means of springs 66 which also tend to draw down the interposers, and the levers 52A, 52B, and 52C are provided with coil springs 67 which urge the levers in a counterclockwise direction against a fixed stop lug 68 carried by the framework.

Figure 12:
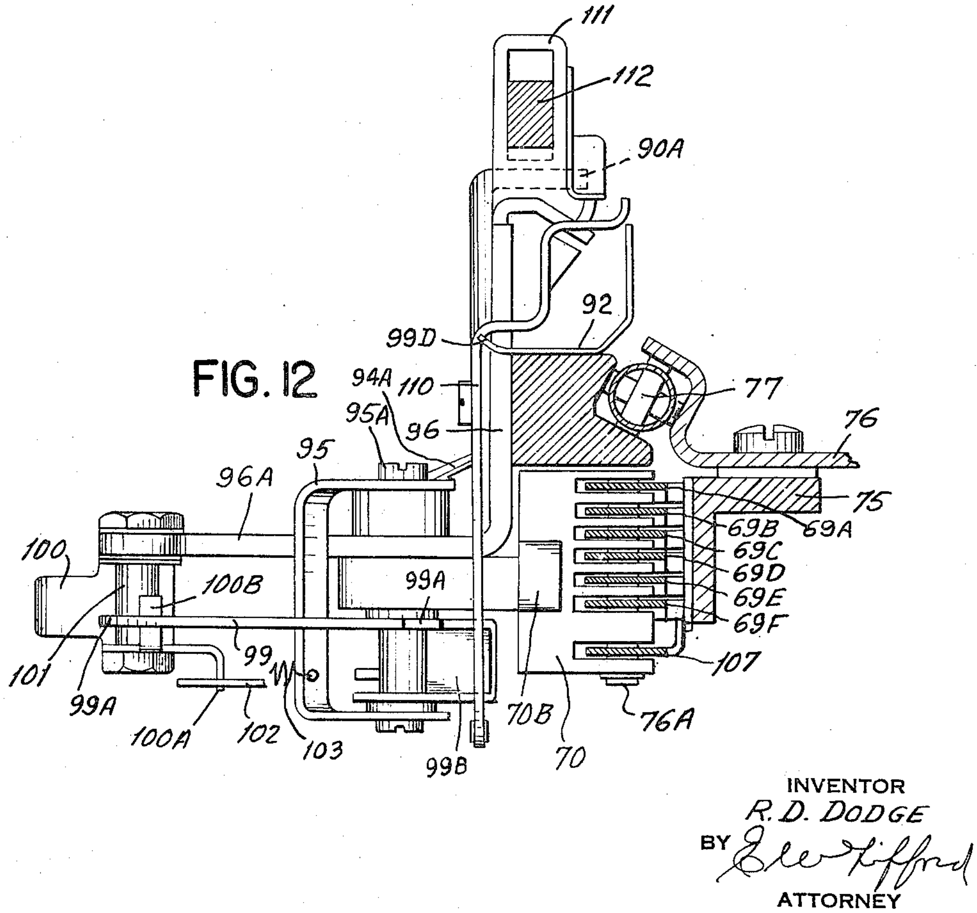
Fig. 12 is a large scale side elevation of the mechanism shown in Fig. 11 as viewed from the right in that figure.

The interposers 55A, 55B, 55C, and 61 selectively operate six escapement pawls which are designated 69A to 69F, respectively. These pawls are of graduated length as most clearly shown in Fig. 20B which indicates a possible condition which may arise in the course of the operation of the machine. The topmost pawl 69A is the longest and the lowermost pawl 69F is the shortest and they are graduated in length so as to differ in length by one unit of spacing. The pawls 69A to 69F are pivotally slidably mounted on a stud 70A carried by a block 70 mounted on the underside of the rear rail 58, the block being provided with six horizontal slots to separate the pawls from each other a small amount as best shown in Fig. 12. This spacing is not shown in Figs. 10, 14, and 15B to 25B as the principal purpose of these figures is to show the positions assumed by the escapement pawls in reference to the supporting stud 70A.

As most clearly shown in Fig. 20B, the mounting slots formed in the pawls 69A to 69F are equal in length and equally spaced from the right-hand ends of the pawls. These slots are just long enough to allow the pawls to move five units of spacing. The pawls are formed with oblong openings 71 (Fig. 20A) in their left-hand ends which are of different lengths but graduated distances from their ends, as best shown in Fig. 20B. The purpose of these openings is to enable a more positive and accurate engagement of the pawls during carriage return and tabulating operations in a manner which will be made clear hereinafter.

Figure 7:
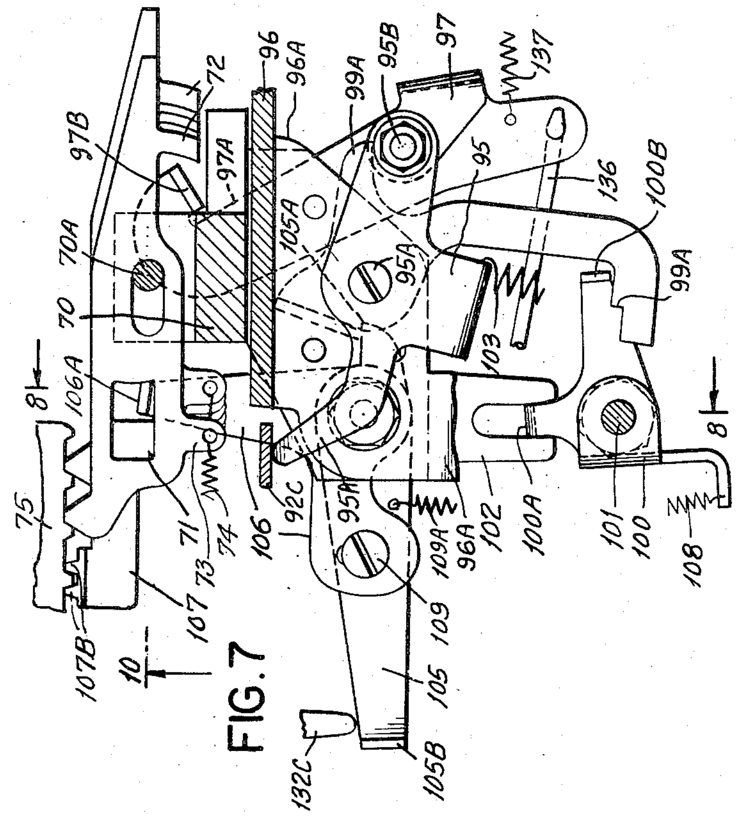
Fig. 7 is a large scale plan view of the spacing mechanism and the mechanism for controlling the escapement pawls during carriage return and tabulating operations.

The pawls are also formed with arcuate lugs 72 (Fig. 20A) which are equally spaced from the right-hand ends of the pawls. The left-hand ends of the pawls are formed with rack engaging lugs or teeth 72A which are the same distances from the left-hand ends of the pawls. Each pawl is also provided with a lug 73 to which is anchored an operating spring 74 tending to draw the pawls to the left and to rock the pawls clockwise (Fig. 7).

Cooperating with the pawls is an escapement rack 75 having its teeth located at intervals of six units of spacing of the carriage and the rack is wide enough to enable all of the pawls 69A to 69F to control the feed of the carriage. This rack is secured in any suitable manner to the bottom of the channel shaped member 76 (Figs. 1 and 12) which forms part of the carriage so that the rack 75 extends parallel with the rear rail 58 directly below and in front of said rail adjacent the bearing 77 for the carriage. Under normal conditions, one of the pawls 69A to 69F always engages a tooth of the rack 75 so as to hold the carriage immovable against the tension of the usual carriage feeding spring (not shown).

Figures 3, 4:
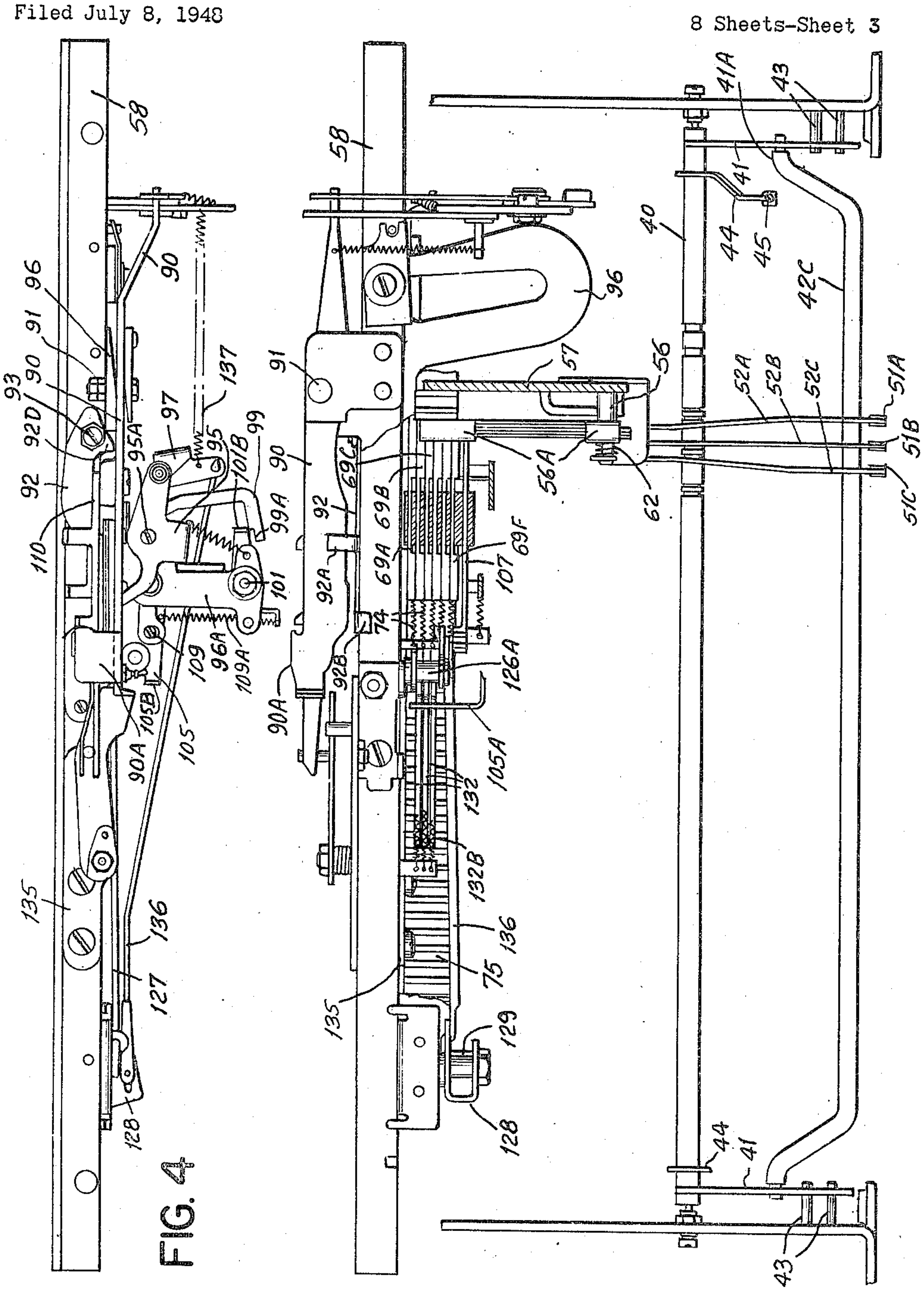
Fig. 3 is a rear elevation showing the selector mechanism and spacing mechanism.
Fig. 4 is a plan view of the mechanism shown in Fig. 3.

The four interposers 61, 55A, 55B, and 55C are arranged in the order named from right to left in Fig. 3, and are spaced apart, center-to-center, a distance equal to one unit of spacing. In Figs. 15A to 19A and 15B to 19B, the dot-dash line denotes the position of a theoretical unit interposer for producing one unit of spacing if it were necesary to make provision for such a small degree of spacing. This theoretical interposer is used as a convenient means of illustrating by a sequence of successive operations shown diagrammatically in Figs. 15A to 19A and 15B to 19B how the escapement mechanism operates in the simplest possible way.

The first condition to be considered is the condition shown in Figs. 15A and 15B in which the pawl 69B is in engagement with a tooth in the rack 75 and is holding the carriage immovable. The pawl 69A under these conditions will be just engaging the next adjacent tooth on the left of the rack 75, as shown in Fig. 15A, and the remaining pawls 69C to 69F will be held against the tooth engaged by the pawl 69B by their springs 74. Under this condition, the theoretical one-unit interposer (Fig. 15B) will occupy a position just behind the extreme right-hand end or tail of the pawl 69B but will be clear of the tails of the remaining pawls. If now the theoretical unit interposer is rocked clockwise on the pivot 56 (Fig. 1), the pawl 69B will be disengaged from the rack 75 and the carriage will be free to move to the right in Fig. 3 under the stimulus of the usual carriage feeding spring (not shown), this causing the rack 75 to move to the right in Fig. 15A.

It will be noted in Fig. 15B that the pawl 69C is capable of moving one unit of spacing to the right before the left-hand end of the mounting slot therein engages the stud 70A. Since this pawl is in engagement with a tooth in the rack 75, it means that the carriage will be permitted to move only one unit of spacing. Of course, all of the remaining pawls 69D, 69E, and 69F will move to the right with the pawl 69C, but the actual amount of carriage movement will be determined solely by the pawl 69C. At the end of this operation, the pawls will assume the position shown in Figs. 16A and 16B.

As soon as the pawl 69B is carried clear of the rack 75, its spring 74 will draw the pawl to the left as far as it will be permitted to go by the stud 70A. At the same time, since the pawl 69A is still in engagement with the next adjacent tooth on the left to the one formerly engaged by the pawl 69B, the pawl 69A will also be moved to the right one unit of spacing and the pawls 69A, 69B will be aligned as shown in Fig. 16B by the tooth in the rack. This movement has pushed the pawl 69C to the right from the position of Fig. 15B to the position of Fig. 16B to place the right-hand end or tail of the pawl 69C in the plane of the theoretical one-unit interposer. If now the interposer is operated again, the pawl 69C will be released from rack 75 and pawl 69D will permit the carriage to move one additional unit to the right carrying pawl 69D to the position of Fig. 17B in which the stud 70A acts as a stop to limit the movement of the pawl 69D. The spring for the pawl 69C will draw this pawl to the left until it is stopped in alignment with the pawls 69A, 69B so that, after the second unit spacing operation, the parts will have the position shown in Fig. 17B.

Upon a fourth and fifth operation of the theoretical one-unit interposer, the pawl 69E (Fig. 17B) and the pawl 69F (Fig. 18B) will permit the carriage to move two units in succession. With each operation, the selected pawl 69D, 69E, respectively, is drawn to the right into alignment with the previously operated pawls and the next adjacent pawl below the selected pawl permits the carriage to move one unit. At the end of this series of five operations all of the pawls save the lowest one, 69F, will have been operated and the pawls 69A to 69E will all have been aligned as shown in Fig. 19B.

If now the pawl 69F is operated, the pawl 69A will permit the carriage to move one more unit of spacing and the pawls 69A to 69F will take the positions shown in Fig. 20B. Upon still another operation of the theoretical one unit interposer, the pawls 69A, 69B will be operated and the pawl 69B will allow the carriage to move one unit, restoring the assembly of pawls to the position of Figs. 15A and 15B.

The foregoing assumes that it was desired to feed the carriage only one unit of spacing and, under the assumed operating conditions, only one of the pawls 69A to 69F is urged into position to be operated by the theoretic one unit interposer. Under actual conditions where different degrees of spacing are effected by successive operations, several of the pawls may be operated at a time but only one will be effective to limit movement of the carriage. Referring to Fig. 15B, it will be noted that the pawls 69B to 69F are arrayed in stepped formation with their tails and consequently their mounting slots projecting to the right, each one an additional unit of spacing with respect to the others. This means that the tail of the pawl 69C will be in a position to be operated by the two unit interposer 61 and the pawls 69D, 69E, and 69F will be in a position to be operated by the interposers 55A, 55B, and 55C, respectively.

It will be noted that in Fig. 20B the pawl 69B has its right-hand end, as shown by its relation to the dotted line, in position to be operated by the two unit interposer 61 while the pawl 69A is holding the carriage and is in a position to be operated not only by the two unit interposer but by the theoretical one unit interposer. If now the operator desires to space the carriage two units, the pawls 69A and 69B will both be operated and the pawl 69A, which is holding the carriage, and pawl 69B will be released and will be drawn to the left by their springs 74 into engagement with the next tooth of the rack 75 on the left, as shown in Fig. 21A. The actual movement of the carriage will be limited by the pawl 69C (Fig. 20B) because this pawl has not been disengaged from the tooth in the rack and it alone is capable of moving only two units. Consequently, the actual carriage movement will be determined by the mounting slot in pawl 69C, the left-hand wall (Fig. 20B) of which is two units away from the stud 70 so that the parts will assume the position shown in Fig. 21B. It will be noted by reference to Fig. 21B that although the pawl 69A was released, it did not finally stop at the end length of the slot owing to the fact that the tooth next on the left to the one holding the pawls 69C to 69F in alignment, moves to the right two units, so that the net motion of the pawl 69A is only three units of spacing. With reference to Fig. 21B, it will be noted that the pawl 69C is now holding the carriage and the pawl 69D has been carried into a position to be operated by the two units interposer 61. If this interposer is again operated, the pawl 69D will be released and the pawl 69E will permit the carriage to move two units.

Figs. 22A and 22B illustrate the same condition as prevails in Figs. 18A and 18B in which it will be noted that the tails of the pawls 69A, 69E, and 69F are aligned as shown by the double dot and dash line, so as to be operable by the three-unit interposer 55A. If this interposer is now operated, all three of these pawls will be actuated and the carriage will be released by the pawl 69E with the result that the pawl 69B will permit the carriage to move three units of spacing.

Figs. 23A and 23B show the same condition as found in Figs. 15A and15B and it will be noted that the pawls 69B to 69E all are in position to be operated by the four unit interposer 55B which is represented by a fine solid line. When this happens, the pawl 69F, which is the only one in engagement with the tooth engaged by the pawls 69B to 69E capable of four units of movement, will limit carriage movement to four units of spacing by moving to the position of Fig. 24B.

Figs. 24A and 24B illustrate the same condition as in Figs. 19A and 19B in which all of the pawls except the pawl 69E are in a position to be operated by the five unit interposer 55C, denoted by a thick line. When this interposer is operated, the pawl 69E is the only one not actuated by the five unit interposer and it remains in contact with a tooth in the rack 75 to limit movement thereof to five units of spacing, the pawls assuming the positions of Figs. 25A and 25B at the end of this operation.

Figure 10:
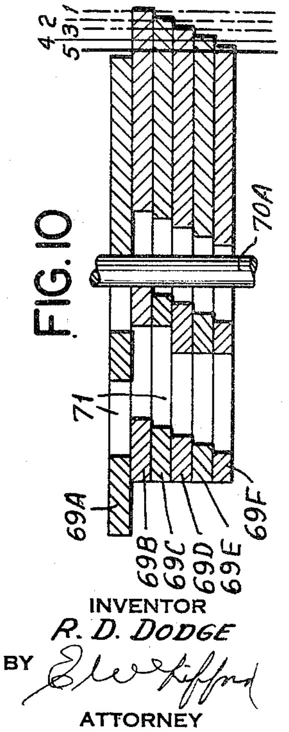
Fig. 10 is a vertical section on the line 10—10 in Fig. 7.
Figure 11:
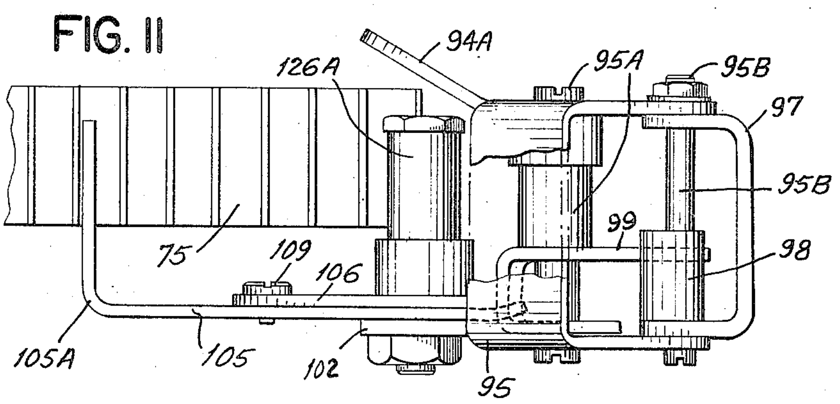
Fig. 11 is a large scale rear elevation of the mechanism shown in Fig. 7.

In Figs. 25A and 25B, the parts have been restored to the positions of Fig. 18B as a consequence of the five unit spacing from the positions shown in Figs. 24A and 24B. In Fig. 10, the positions of the various interposers, including the theoretical one-unit interposer, are indicated by the small numbers 1 to 5, designating the same kinds of lines in Fig. 15B to 24B.

If it is desired to effect six units of spacing, it is necessary to release all of the pawls from the rack 75 and this may be done by shifting the group of interposers 61 and 55A to 55C bodily to the left in Fig. 3, one unit of spacing, so that the two-unit interposer 61 is placed in the normal position of the three-unit interposer and the five-unit interposer is positioned so as to operate all of the pawls 69A to 69F regardless of their positions.

There are six possible combinations of positions of the pawls 69A to 69F, the first five combinations being shown in succession in Figs. 15B to 19B and the sixth in Fig. 20B and any one of these six positions may precede any one of five space selecting operations according to whether two, three, four, five or six units of spacing are required. In each case there will be as many pawls operated as there are units of spacing allotted to the letter which is to be printed. It will be noted in examining Figs. 15B to 19B and 20B that, no matter how the pawls are arranged after any given spacing operation, they are always positioned so that two, three, four or five pawls will be operated for the corresponding number of units of spacing.

This is readily seen in Fig. 25B, for example, if, with this arrangement of the pawls it is desired to space five units, the pawls 69A, 69B, 69C, 69E, and 69F will be operated and pawl 69D will permit five units of spacing. If four units of spacing are desired, the pawls 69A, 69B, 69E, 69F will be operated and pawl 69C will determine four units of spacing. If three units of spacing are desired, the pawls 69A, 69E, and 69F will be operated and pawls 69B will allow three units of spacing. Similarly, two units of spacing will be determined by operating only the pawls 69E, 69F, and the pawl 69A will limit carriage movement to two units.

The machine may be equipped with the usual tabulating mechanism of the same general type as disclosed in Patent No. 1,935,436. This tabulating mechanism includes a tabular lever 90 (Figs. 3, 4, and 26) which is rocked in a horizontal plane in a well known way about the pivot 91 by power mechanism similar to that ordinarily used for operating type bars and controlled by the tabular key (not shown). This lever is rocked clockwise in Fig. 4 to place the counter stop lug 90A in the path of a tabular stop (not shown) carried by the carriage. This movement actuates the usual release lever 92 (Fig. 26) pivotally mounted at 93 on the top of the rear rail 58 in a well known way. The lever 92 is rocked counterclockwise in Fig. 6 by the tabular lever through the medium of a lug 92A formed therein which extends upwardly in the rear of the tabular lever, as most clearly shown in Fig. 26. This lever 92 also has a lug 92B which projects upwardly in the path of movement of the usual release bail 94 carried by the carriage and actuated by the usual carriage release levers (not shown) which are pivotally mounted at the ends of the carriage. These are all details of construction which are well known in the art and will not be described in detail herein.

The release lever 92 has a lug 92C which, as most clearly shown in Fig. 7, engages the arm 94A of a lever 95 pivoted at 95A on a stud carried by an extension 96A of the plate 96 on which the tabular lever 90 is pivotally mounted at 91. Pivotally mounted at 95B is a release lever 97 having an arm 97A which extends to a point under the escapement pawls 69A to 69F and is formed with a lug 97B which projects upwardly just to the left (Fig. 7) of the extensions or lugs 72 formed in the escapement pawls. When the tabular lever 90 is actuated in a counterclockwise direction (Fig. 26) or the arm 92 is actuated in a counterclockwise direction by the release bail 94, the lever 95 will be rocked counterclockwise (Fig. 7) and the lug 97B, moving upwardly from the position of Fig. 7 to the position of Fig. 9, will disengage the escapement pawls 69A to 69F from the rack 75 and allow the carriage to move freely under the influence of the usual carriage feeding spring.

Figures 8, 9:
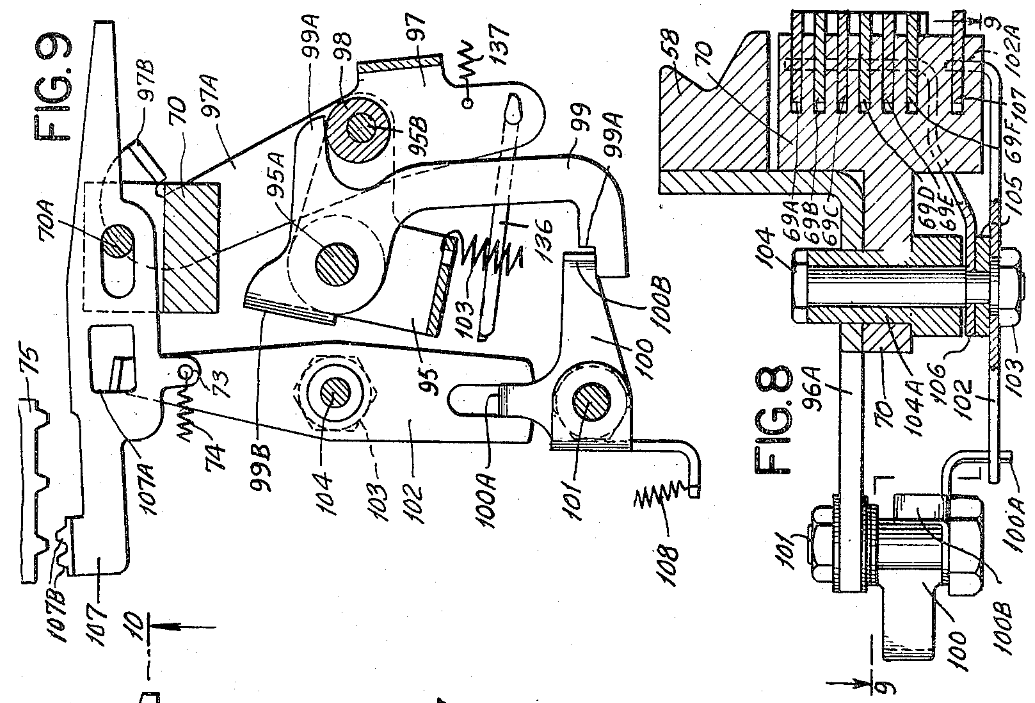
Fig. 8 is a vertical section on the line 8—8 in Fig. 7.
Fig. 9 is a horizontal section on the line 9—9 in Fig. 8.

The lever 97 has an adjustable eccentric stop 98, most clearly shown in Fig. 9, which normally engages an arm 99A of a latch lever 99 pivoted on the stud 95A. This latch lever normally has the position shown in Fig. 7. Cooperating with the latch lever 99 is a latch lever 100 pivoted at 101 on a stud carried by the extension 96A of the plate 96. The lever 100 has a bent-over lug 100A projecting into a slot formed in a lever 102. As shown in Fig. 8, the lever 102 is pivoted on a shoulder formed in a nut 103 threaded on the lower end of a shouldered stud 104 which is received in the bore of a bushing 104A projecting through the block 70 and the extension 96A. The nut 103 clamps together an arm 105 and a lever 106 so that the levers 105, 106 are pivotally mounted on the bushing 104A by means of the stud 104 but pivotal movement thereof is not communicated to the lever 102. The latter has an upstanding lug 102A which extends into the rectangular opening 107A (Fig. 9) of a pawl 107 which is pivotally slidably mounted on the pin 70A in the same manner as the escapment pawls 69A to 69F. This pawl 107 is urged to the left by a spring 74 similar to those which actuate the escapement pawls and is provided with teeth 107B capable of engaging the teeth of the rack 75 but this pawl 107 is not provided with a lug 72 but is actuated by the lug 97B when the carriage is released by hand or during a tabulating operation.

When the latch lever 99 rocks counterclockwise, as described above, it travels from the position of Fig. 7 to the position of Fig. 9 and at the same time, the escapement pawls and the pawl 107 will be drawn by springs 74 to the left as far as they will go. This permits the lever 100 to be rocked in a clockwise direction by a spring 108. One arm of the lever 100 has a latch lug 100B cooperating with a latching shoulder 99A formed in the lever 99 and the aforesaid movement of lever 100 moves the lug 100B into a latching relation with the shoulder 99A thus preventing the lever 99 from restoring as in Figs. 9 and 13. Thus, when the bail 94 or the tabular lever 90 is released, a spring 103 restores the lever 95 and the lever 97 to the position of Fig. 7, allowing the escapement pawls and the pawl 107 to reengage the escapement rack but the lever 99 will be held in shifted position temporarily by the lug 100B.

The teeth 107B on the pawl 107 are spaced apart three units of spacing and it should be explained that the teeth on the tabular rack (not shown) carrying the tabular stops are spaced apart three units of spacing. Owing to this spacing, when the pawl 107 reengages the rack, it will either engage a tooth on said rack between the teeth 107B or one of the teeth in rack 75 will engage the left-hand face of the left-hand tooth 107B.

The latch lever 99 (Fig. 7) is shaped to form a bail having the cross piece 99B which engages a tooth 105A forming part of the lever 105 which, it will be recalled, is clamped to the side of the lever 106. The levers 105, 106 are adjustably connected together by a clamping screw 109 and this assembly is urged in a counterclockwise direction by a spring 109A.

When the escapement pawls 69A to 69F and the pawl 107 are released as described and the latch lever 99 is moved to the position of Fig. 9, a lug 106A formed in the lever 106 and extending upwardly through all of the openings 71 in the escapement pawls, moves to the right in Fig. 7 and aligns the pawls 69A to 69F, as shown in Fig. 14, in which it will be noted that pawls 69A and 69D are three units away from the pin 70A. Thus, when the pawls are allowed to reengage the rack, as at the end of a tabulating operation of the carriage, the carriage will be allowed to move three additional units in a letter spacing direction and either pawl 69A will hold the carriage as in Fig. 20B or pawl 69D as in Fig. 17B.

The reason for this mode of operation is that the units of spacing are so small that it is not practical to cut teeth on the tabular stop rack at such close intervals as one unit of spacing and the spacing of three units is selected as a compromise which provides adequate strength to absorb the shock of tabulating movement and the finest permissible degree of positioning of the column stops. It will be appreciated, of course, that one unit is quite small in relation to the normal spacing of $\frac{1}{10}$ of an inch most common in typewriting machines so that three units give a closer spacing of the column stops than would ordinarily be obtained with the most common spacing used in typewriting machines.

An advantage of positioning the pawls as in Fig. 14 during tabulating operations, and in carriage-return operations, is the more accurate reengaging of the pawls when they are released. There is at least three units of spacing margin for reengagement of the pawls instead of only one unit as would be the case if dependence were placed on any single pawl to drop behind a tooth with a clearance of less than one unit of spacing. In the past fine pitched ratchet wheels of large diameter geared to the rack with relatively high gear ratios have been used to obtain fine degrees of spacing. Due to friction, wear, back-lash of the parts, and springing, it was found to be very difficult to always catch the right tooth when reengaging the escapement pawl due to the very narrow tooth spacing. The present invention avoids this by in effect expanding the rack spacing or the spacing of the teeth on the ratchet wheel for the purpose of ensuring accurate columns and margins.

When the carriage moves the additional three units of spacing mentioned above, the pawl 107 is carried to the right (Fig. 9) three units and rocks the lever 102 clockwise thereby releasing the latch lug 99A from the latch lever 99 and permits the spring 109A to restore the lever 99 to the position of Fig. 7.

The pawl 107 normally is free to engage the rack 75 and its mounting slot for stud 70A is six units long so that when the pawl is in its extreme left-hand position as in Fig. 9, the left-hand end or tail of the pawl will be clear of the five-unit interposer when all of the interposers have been bodily shifted to the left in the manner hereinafter described. During the normal spacing movement of the carriage, the pawl 107 travels to the right with the carriage to bring the tail of the pawl into position to be operated by the interposers 61, 55A, 55B, and 55C so that the pawl 107 can never travel far enough to block carriage movement without being operated by one of the interposers and disengaged from the rack 75. The worst condition which could be encountered would be a series of three two unit spacing operations commencing with the pawl 107 in its extreme left-hand position. This will carry the pawl up to a position in which the tail is operable by the interposer 61 so that on the next spacing operation regardless of what the actual spacing is to be, the pawl 107 will be disengaged by at least one of the interposers. It will be recalled that the interposer 61 is operated with every spacing operation although it may not have any practical effect as one of the interposers may be selectively operated at the same time to effect a higher degree of spacing than the interposer 61 effects alone. Thus, the pawl 107 although it is normally engaged with the rack 75, does not interfere with the normal spacing movement of the carriage. The pawl 107 acts as a safety to prevent the carriage from running free to the right-hand marginal stop when it is necessary to operate a type bar by hand during the course of servicing the machine or effecting repairs. As will be seen hereinafter, there are times when six spaces are desired to be effected under control of the expand mechanism and during these operations the pawl 107 also acts as a safety to insure that no more than six spaces result when all of the escapement pawls are disengaged to effect a six unit spacing operation.

When the carriage is returned, the mechanism is operated in very much the same way as described above through the medium of the release lever 92. This release lever is provided with an upstanding ear 92D (Figs. 4, 12, 26, and 29) which projects into the plane of the usual carriage-return trip lever 110 whereby the release lever 92 is rocked counterclockwise (Fig. 26) and thereby releases the escapement pawls 69A to 69F in the manner described above as a preliminary to returning the carriage. The trip lever 110 projects into the path of the usual left-hand marginal stop 111 carried by the marginal stop rack 112 and, during the course of the carriage-return movement, as the marginal stop 111 approaches the marginal position, the trip lever 110 is actuated in the well known way to disengage the carriage-return clutch and allow the carriage to coast a short distance until it is arrested by the engagement of the marginal stop with the lug 90A formed in the tabular lever 90. The disengagement of the trip lever 110 allows the restoration of the release lever 92 and permits the escapement pawls and the pawl 107 to reengage the rack. The disengagement of the carriage-return clutch allows the carriage to move about three units in a letter spacing direction and the pawl 107 will be operative to rock the latch lever 99, as described above, restoring the parts to the position of Fig. 7. The carriage-return mechanism may be of the type shown in Patent No. 1,955,614 which discloses all of the parts except the lug 92D.

It is desirable for certain kinds of typewritten matter to be able to write the characters, as, for example, the letters of a heading line or matter which is to be specially emphasized, with slightly increased spacing and, accordingly provision is made for bodily shifting the cage 56A and the interposers 61 and 55A to 55C to the left (Fig. 3) for the purpose of changing the selective effect of these interposers on the escapement pawls by one additional unit so that the minimum spacing is three units instead of two and the maximum spacing is six units instead of five. The mechanism for effecting this operation is best shown in Figs. 27 and 28.

Pivoted at 115 on the bracket 57 (Fig. 28) is a Y-shaped lever 116, the longer arms of which are disposed on opposite sides of a stop stud 117 carried by the bracket 57. A toggle spring 118 connected to a pin carried by the right-hand arm of the lever 116 and to a fixed stud carried by the bracket 57 urges the lever 116 in a clockwise direction (Fig. 28) which is limited by the stud 117. The lever 116, adjacent its pivot 115, is connected to a vertical link 119 which, as best shown in Fig. 27, is offset to the left and provided with a button 119A which bears against a cam surface 70B formed in the block 70 carrying the escapement pawls.

The lever 116 is connected by a horizontal link 120 to a suitable key or operating lever located at the front of the machine which may be actuated to push the link to the left (Fig. 28) when it is desired to expand the spacing. This rocks the lever 116 counterclockwise until the right-hand arm of the lever engages the stop stud 117 thereby drawing down the link 119 and causing the button 119A to travel downwardly over the cam surface 70B. The cage enclosing the interposers 61 and 55A, 55B, and 55C is pressed by a coil spring 121 to the left (Fig. 27) against the right-hand end of the button 119A, thereby compelling the cage and the interposers to travel to the left one unit of spacing when the button 119A is drawn downwardly. This causes the two-unit interposer to assume the position normally held by the three-unit interposer and the five-unit interposer assumes a position one unit to the left of that it normally holds. Thus, when the interposers are selectively operated as described above, the two-unit interposer causes three units of spacing and the three-unit interposer four units of spacing. Normal operation of the two-unit interposer, in the absence of selection of the three, four, or five-unit interposers, causes three units of spacing instead of two units.

If the five-unit interposer is operated with the cage 56A shifted as described, all of the escapement pawls will be released and the springs 74 will draw them to the left. Taking, for example, the positions of Figs. 15A and 15B, this will cause the pawl 69B to move five units to the left in a position to engage the tooth in Fig. 15A at the extreme left and the remaining pawls will move to the left in a position to engage the tooth formerly engaged by the pawl 69A. The carriage will move six units of spacing and the rack 75 will travel a similar distance to the right in Fig. 15A and restore the pawls to the positions shown in Figs. 15A and 15B. Although the pawls can only move a maximum distance of five units the carriage actually moves six units because at the instant the carriage starts to move, allowing for the inertia of the carriage, the extreme left-hand tooth in Fig. 15A will be one unit of spacing further to the left than the tooth 72A of the pawl 69A. The same general remarks apply to the second tooth from the left in Fig. 15A with the net result that, at the end of the six unit spacing operation, the pawl 69B still holds the carriage against movement. Regardless of which of the six basic positions (Figs. 15A to 20A) which the pawls may take the same action will take place and the parts will always be restored to the condition they formerly had. This is due to that fact that when any tooth is disengaged from a tooth, it cannot travel any further than the next tooth on the left so that if the pawls are grouped, some engaging one tooth and some in a position to engage the next adjacent tooth, when they are released, they will always be restored to the original position.

It is desirable that means be provided to back-space the carriage and in the present case provision is made for back-spacing only one unit. The back-space mechanism is shown most clearly in Fig. 2. Pivoted at 125 on a suitable bracket carried by the rear rail is an arm 126 which is connected by a link 127 to a lever 128 pivoted at 129 on the rear rail. The lever 128 is provided with a link 130 which extends toward the front of the machine and is connected to a suitable power unit generally similar in principle to those which operate type bars and controlled by the back-spacing key (not shown). The arm 126 is held by a spring 131 in the position of Fig. 2 against a suitable stop (not shown) and has pivoted to it at 126A a series of three back-space pawls 132, each formed with two teeth 132A normally clear of the teeth in the escapement rack 75. These pawls are urged in a clockwise direction by springs 133 but, in the position of Fig. 2, they are held clear of the escapement rack by a stop stud 134 which limits clockwise rotation of the pawls 132 under the stimulus of the spring 133.

When the link 130 is drawn upwardly in Fig. 2 by the power unit, the lever 128 is rocked clockwise thereby rocking the arm 126 counterclockwise and carrying the pivoted connection 126A to the left. This allows the three backspace pawls 132 to swing into engagement with the rack 75 and, in the initial movement of the arm 126, the extensions 132B of the pawls are swung close to the rack 75 and in a position to engage a bent-over lug 135A carried by a suitable plate 135 mounted on the rear rail 58. With further movement of the arm 126, the extensions 132B move to the left and at least one of the pawls 132 will have one or the other of its teeth engaging a tooth in the rack 75 and move the carriage backwardly a little over a unit of spacing which will bring the extensions 132B into engagement with the lug 135A and arrest further movement of the carriage. The lug 135A and the extensions 132B are so shaped that the lug 135A acts as a cam to tend to jam the teeth 132A into the escapement rack and prevent overthrow of the carriage, the slight excess movement of the carriage being permitted to insure correct reengagement of the escapement pawls when the carriage is back spaced.

The teeth 132A total six in number and they are disposed diagonally in a vertical plane so that in effect, considering their projections on a horizontal plane, they are spaced one unit of spacing apart with respect to the rack 75. Thus, no matter where a tooth in the rack 75 happens to be at the start of the back-spacing operation, it will be sure to be picked up by one of the teeth 132A.

The lever 128 also has a link connection 136 with the lever 97 (Fig. 7) which link 136 is drawn to the left thereby rocking the lever 97 clockwise and moving the lug 97B to the right (Fig. 7) into engagement with the lugs 72 on the escapement pawls. This draws the escapement pawls to the right until all of the pawls engage the pin 70A. This causes the escapement pawls to be arrayed in exactly the opposite sense of Fig. 20B with the teeth 72A in a staggered relation. Bearing in mind that the pawls have not been disengaged from the rack by this movement and the fact that the lugs 70A are now arrayed in such a fashion as, projected on a horizontal plane, they are one unit of spacing apart, there is bound to be at least one which will be capable of dropping behind a tooth on the rack 75 and, as soon as the back-space mechanism is restored, the pawl which so acts will be operative to hold the carriage against movement in a letter-spacing direction. The lever 97 is restored after each operation by a spring 137 which normally holds the lug 97B against the block 70 which supports the escapement pawls.

It is desirable to prevent operation of the back-spacing mechanism when the carriage is being tabulated or returned by power. For this purpose the lever 105 has an arm provided with a lug 105B (Fig. 7) normally clear of the tails 132C of the back-space pawls 132. When the lever 105 is rocked clockwise in Fig. 7 to the position of Fig. 13, the lug 105B moves to a position immediately to the left of the tails 132C and compels the pawls 132 to rock counterclockwise about the lug 105B as a pivot thus preventing the teeth 132A from engaging the escapement rack 75.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a variable spacing mechanism, an escapement rack movable in a character spacing direction, said rack having teeth spaced apart at uniform intervals, each interval being a multiple of a minimum unit of spacing; a series of spacing pawls coacting with said teeth, equal in number to the number of units in said interval, said pawls being of different lengths differing by whole units of spacing, means for mounting said pawls for sliding movement an extent sufficient to enable the rack to move the maximum distance of one interval, and means for disengaging one or more of said pawls from said rack according to the desired number of units of spacing.

2. In a variable spacing mechanism, a rack having its teeth spaced apart at uniform intervals, each interval being a fixed multiple of a minimum degree of spacing; and a series of escapement pawls coacting with said rack, each pawl being independently slidable an extent sufficient to permit escapement of said rack one whole interval if all of said pawls are released while one of them is engaging a tooth in said rack, said pawls being slidably mounted different distances from the ends coacting with said rack and said distances differing by whole units of spacing whereby said rack will be permitted to move a number of units of spacing determined by the number of pawls released from said rack.

3. In a variable spacing mechanism, a member movable in a character spacing direction and having a series of stop portions disposed at regular intervals, each interval being divided into a fixed number of units of spacing; a series of space controlling members equal in number to the number of units in said interval; mounting means for said space controlling members enabling said first member to move said space controlling members in a character spacing direction, including means for limiting the strokes of said space controlling members by said first member to progressively increasing distances differing by whole units of said interval, and a selector device for releasing said space controlling members from said first member selectively.

4. In a variable spacing mechanism, a member having a series of stop elements spaced at regular intervals, each interval being divided into a fixed number of units of spacing; a series of space controlling members equal in number to the number of units in said interval and coacting with said first member, any one of said controlling members normally engaging one of said stop elements, said controlling members being mounted for movement by said first member in a character spacing direction extents differing by whole units of said interval, said controlling members being releasable from said stop elements in one or more combinations to enable the first member to move an extent determined by one of the remaining controlling members; and means for selectively releasing said controlling members from said stop elements.

5. In a variable spacing mechanism, a member having stop elements located at equally spaced intervals, each interval representing a plurality of space increments, and movable in a character spacing direction; a series of space controlling stop members movable with said first member, each stop member normally engaging one of said stop elements; means for limiting the movement of said stop members to progressively increasing distances which are a multiple of a unit of spacing, one of said stop members normally holding said first member against movement and, when released, allowing the first member to move an extent determined by the stop member having the next shortest extent of movement which remains in engagement with a stop element; and means for releasing said one stop member and one or more of the other stop members to control the extent of movement of the first member.

6. In a variable spacing mechanism, a member movable in a character spacing direction and having a series of stop elements spaced at regular intervals, each interval being a multiple of a fixed increment of spacing; a fixed stroke limiting element; a series of space controlling stop members engaging said stop elements and movable by said first member toward said stroke limiting member, said stop members having different effective lengths in relation to said limiting element differing by said increment, any one of said stop members normally holding said first member and, when released with one or more of the remaining stop members, allowing said first member to move an extent determined by the unreleased stop member having the longest effective length; and means for selectively releasing said stop members, one or more at a time, beginning with those stop members having the longest effective lengths.

7. In a variable spacing mechanism, a member movable in a character spacing direction and having a series of stop elements disposed on said member at regular intervals, each interval being a multiple of a basic space increment, a fixed stop, a series of space controlling members equal to the number of increments in the interval and shaped to have progressively increasing limited movements by said first member, through engagement with said stop elements, toward said fixed stop, and means for releasing varying numbers of said space controlling members in rotation, beginning with the members having the shortest movement, according to the number of increments of spacing required.

8. In a variable spacing mechanism, an escapement rack movable in a character spacing direction, said rack having teeth spaced apart at uniform intervals, each interval being a multiple of a minimum increment of spacing; a series of spacing pawls coacting with said teeth, equal in number to the number of units in said interval, said pawls being movable by said rack different extents differing by whole units of spacing, and means for disengaging one or more of said pawls from said rack in rotation to enable the rack to move the desired number of units of spacing.

9. In a variable spacing mechanism, a rack having its teeth spaced apart uniform intervals, each interval being a fixed multiple of a minimum degree of spacing; and a series of escapement pawls coacting with said rack; each pawl being independently slidable an extent sufficient to permit escapement of said rack one whole interval if all of said pawls are released while one of them is engaging a tooth in said rack, said pawls being slidably mounted different distances from the ends coacting with said rack and said distances differing by whole units of spacing whereby said rack will be permitted to move a number of units of spacing determined by the pawl unreleased from said rack which moves the shortest distance.

10. In a variable spacing mechanism, a rack movable in a character spacing direction and having a series of teeth disposed at regular intervals, each interval being divided into a fixed number of units of spacing; a series of space controlling pawls equal in number to the number of units in said interval, mounting means for said pawls enabling said rack to move said pawls in a character spacing direction, including means for limiting the strokes of said pawls by said rack to progressively increasing distances differing by one unit of said interval, and a selector device for releasing one or more of said pawls from said rack selectively in rotation.

11. In a variable spacing mechanism, a rack having its teeth spaced at regular intervals, each interval being divided into a fixed number of units of spacing, a series of space controlling pawls equal in number to the number of units in said interval and engaging the teeth in said rack, any one of said pawls normally engaging one of said teeth, said pawls being mounted for movement by said rack in a character spacing direction extents differing by whole units of said interval, said pawls being selectively releasable from said rack in one or more combinations in rotation to enable the rack to move an extent determined by one of the remaining pawls, and means for selectively releasing said pawls from said rack.

12. In a variable spacing mechanism, a rack having teeth located at equally spaced intervals, each interval representing a plurality of space increments, and movable in a character spacing direction; a series of space controlling pawls movable with said rack, each pawl normally engaging one of said teeth; means for limiting the movement of said pawls to progressively increasing distances which are a multiple of a unit of spacing, one of said pawls normally holding said rack against movement and, when released, allowing the rack to move an extent determined by the pawl having the next shortest extent of movement which remains in engagement with a tooth in said rack; and means for releasing said one pawl and one or more of the others to control the extent of movement of the rack.

13. In a variable spacing mechanism, a rack movable in a character spacing direction and having its teeth spaced at regular intervals, each interval being a multiple of a fixed increment of spacing, a fixed stroke limiting element; a series of space controlling pawls engaging the teeth on said rack and movable by said rack toward said stroke limiting element, said pawls having different effective lengths in relation to said limiting element differing by said increment, any one of said pawls normally holding said rack and, when released with one or more of the remaining pawls, allowing said rack to move an extent determined by the unreleased pawl having the longest effective length; and means for selectively releasing said pawls, one or more at a time, beginning with those pawls having the longest effective lengths.

14. In a variable spacing mechanism, a rack movable in a character spacing direction and having teeth disposed at regular intervals, each interval being a multiple of a basic space increment, a fixed stop, a series of space controlling pawls equal to the number of increments in the interval and shaped to have progressively increasing limited movements by said rack toward said fixed stop, and means for releasing varying numbers of said pawls in rotation beginning with the pawls having the shortest movement, according to the number of increments of spacing required.

15. In a variable spacing mechanism, an escapement rack having teeth disposed at regular intervals, each interval being divided into a plurality of space increments considerably smaller than the spacing of said teeth; a series of spacing pawls all normally engaging the teeth of said rack and having slots for slidably mounting said pawls for movement in a character spacing direction by said rack, the ends of said slots being disposed different distances from the tooth engaging portions of said pawls, said distances differing by whole increments of spacing; and a pivot extending through said slots and operative to limit sliding movement of the pawls to an extent determined by the lengths of the slots, any one of said pawls normally holding the rack against motion in a character spacing direction by engagement of the end of its slot with said stop pivot with the ends of the slots in the remaining pawls arrayed different distances from said pivot whereby the release of said one pawl will allow the rack to move in a letter spacing direction an extent determined by the pawl having the end of its slot nearest said pivot, the slots in said pawls being of such length that, when a pawl holding said rack is released, it engages the next succeeding tooth on said rack in a position to allow the maximum movement of said rack when the remaining pawls are released, said slots, when different numbers of pawls are released, permitting the rack to move proportionally different distances according to the number of pawls released, said pawls when released from one tooth engaging the next succeeding tooth whereby the pawls having their slots proportionally nearest the pivot and controlling shorter spacing automatically are aligned by said next succeeding tooth to control longer spacing.

16. In a variable spacing mechanism, an escapement rack movable in a character spacing direction; a series of spacing pawls of graduated lengths representing different fractions of the interval between the teeth on the rack, said pawls normally travelling with said rack in a character spacing direction until disengaged therefrom; and stop means for limiting the stroke of any pawl to less than one tooth interval, said stop means normally engaging any one of said pawls to hold said rack against movement in a character spacing direction, the teeth defining said intervals aligning the remaining pawls so as to permit movement of the rack progressively increasing fractions of a tooth interval according to the number of pawls released, including the one engaging said stop means.

17. In a variable spacing mechanism, a member movable in a character spacing direction and having stop elements spaced at regular intervals equal to the maximum width of a character, a fixed stop; a series of space controlling stop members normally engaging said stop elements and movable with said member in a character spacing direction toward said fixed stop until arrested thereby, said stop members having different effective lengths with reference to said fixed stop so that only one of said stop members at a time may be arrested by said fixed stop and hold said first member against movement in a character spacing direction, said one stop member, when released, permitting said movable member to move an extent permitted by that remaining stop member which has the next shortest possible movement permitted by its position in relation to said fixed stop; and means for releasing one or more of said stop members, beginning with the one holding the movable member and ending with the one having the next shortest permissible movement to the one having the desired degree of freedom.

18. In combination with an escapement rack movable in a character spacing direction and having its teeth spaced at uniform intervals equal to the maximum width of a character; a series of spacing pawls equal in number to the number of possible widths of characters including said maximum width, and means for mounting said pawls for different degrees of freedom of movement by said rack corresponding to said widths, ranging from zero to said maximum, all except the pawl of zero degree of freedom normally travelling with said rack to progressively reduce the degree of freedom of all of said pawls, said pawls when released from one tooth being movable into engagement with the next succeeding tooth to restore them to their initial degrees of freedom, such zero degree of freedom pawl when released automatically resuming its initial maximum degree of freedom.

19. In a variable spacing mechanism, a toothed escapement member having its teeth successively moving in a character spacing direction; a series of space controlling members corresponding in number to a whole number of equal subdivisions of the intervals between teeth of the first member, said space controlling members normally engaging one or more of said teeth, and means for mounting said controlling members so each has a different degree of freedom for movement by the first member, varying from zero to a maximum corresponding to a plurality of said subdivisions, the member corresponding to the zero degree normally holding said first member against movement in a character spacing direction and, when released from one tooth in the first member, being movable to a position to be engaged by the next succeeding tooth so as to have the maximum degree of freedom with respect to the mounting means and permitting the controlling member having the next succeeding degree of freedom to move an extent to limit movement of the first member to such succeeding degree of movement, the remaining pawls progressively decreasing in degree of freedom each time the one having zero degree is released.

20. In a variable spacing mechanism, an escapement rack movable in a character spacing direction; a series of spacing pawls of graduated lengths representing different fractions of the interval between the teeth on the rack, said pawls normally travelling with said rack in a character spacing direction until disengaged therefrom, a stop for limiting the stroke of any pawl to less than one tooth interval, said stop normally engaging any one of said pawls to hold said rack against movement in a character spacing direction, the teeth defining two intervals aligning the remaining pawls so as to permit movement of the rack progressively increasing fractions of a tooth interval according to the number of pawls released including the one engaging said stop; and a series of release members for said pawls arrayed different distances from said stop and representing different fractions of said interval, said pawls being moved by said rack into positions to be released by said release members whereby the release member for any given fraction of said interval releases the pawls permitting the next lower fractions of said interval from said rack.

21. In a variable spacing mechanism, a member movable in a character spacing direction and having stop elements spaced at regular intervals equal to the maximum width of a character, a fixed stop; a series of space controlling stop members normally engaging said stop elements and movable with said member in a character spacing direction toward said fixed stop until arrested thereby, said stop members having different effective lengths with reference to said fixed stop so that only one of said stop members at a time may be arrested by said fixed stop and hold said first member against movement in a character spacing direction, said one stop member, when released, permitting said movable member to move an extent permitted by that remaining stop member which has the next shortest possible movement permitted by its position in relation to said fixed stop; and means for releasing one or more of said stop members, beginning with the one holding the movable member and ending with the one having the next shortest permissible movement to the one having the desired degree of freedom; including a series of release members positioned to enable said pawls to be progressively brought within the control of the release members by movement of the movable member in a character spacing direction, said one stop member being always releasable by all of said release members.

22. In a variable spacing mechanism, an escapement rack movable in a character spacing direction, said rack having teeth spaced apart at uniform intervals, each interval being a multiple of a minimum unit of spacing; a series of spacing pawls normally engaging said teeth and equal in number to the number of units in said interval, means for mounting said pawls for sliding movement an extent sufficient to enable the rack to move a plurality of different extents up to the maximum distance of one interval; and means for disengaging one or more of said pawls from said rack according to the desired number of units of spacing including a plurality of release members representing a plurality of said extents of spacing and arranged to release said pawls from said rack one or more at a time, each release member releasing as many pawls as the extent of spacing it represents, beginning with the pawl which represents the shortest spacing.

23. In a variable spacing mechanism, a rack having its teeth spaced apart at uniform intervals, each interval being a fixed multiple of a minimum degree of spacing; a series of escapement pawls coacting with said rack, each pawl being independently slidable an extent sufficient to permit escapement of said rack one whole interval if all of the said pawls are released while one of them is engaging a tooth in said rack, said pawls being slidably mounted different distances from the ends coacting with said rack and said distances differing by whole units of spacing whereby said rack will be permitted to move a number of units of spacing determined by the number of pawls released from said rack; and releasing means for said pawls including means operable at different points along the path of sliding movement of said pawls, and effective to release different numbers of said pawls.

24. In a variable spacing mechanism, a member movable in a character spacing direction and having a series of stop portions disposed at regular intervals, each interval being divided into a fixed number of units of spacing; a series of space controlling stop members equal in number to the number of units in said interval; mounting means for said stop members enabling said first member to move said stop members in a character spacing direction, including means for limiting the strokes of said stop members by said first member to progressively increasing distances differing by whole units of said interval; and a selector device for releasing said stop members from said first member selectively including elements disposed at different points along the path of travel of said stop members for releasing different numbers of said stop members to enable said first member to move different distances.

25. In a variable spacing mechanism, a member having a series of stop elements spaced at regular intervals, each interval being divided into a fixed number of units of spacing; a series of space controlling members equal in number to the number of units in said interval and coacting with said first member, any one of said controlling members normally engaging one of said stop elements, said controlling members being mounted for movement by said first member in a character spacing direction extents differing by whole units of said interval, said controlling members being releasable from said stop elements in one or more combinations to enable the first element to move an extent determined by one of the remaining controlling members; and means for selectively releasing said controlling members from said stop elements, including actuating means effective at different selected points, representing a plurality of the different extents of spacing, along the path of movement of said controlling members so as to release different combinations of said controlling members.

26. In a variable spacing mechanism, a member having stop elements located at equally spaced intervals, each interval representing a plurality of spaced increments, and movable in a character spacing direction; a series of space controlling stop members movable with said first member, each stop member normally engaging one of said stop elements; means for limiting the movement of said stop members to progressively increasing distances which are a multiple of a unit of spacing, one of said stop members normally holding said first member against movement and, when released, allowing the first member to move an extent determined by the stop member having the next shortest extent of movement which remains in engagement with a stop element; and means for releasing said one stop member and one or more of the others to control the extent of movement of the first member, including a series of releasing members arranged to release a progressively increasing number of said controlling elements beginning with the one which normally holds said first member.

27. In a variable spacing mechanism, a member movable in a character spacing direction and having a series of stop elements spaced at regular intervals, each interval being a multiple of a fixed increment of spacing; a fixed stroke limiting element; a series of space controlling stop members engaging said stop elements and movable by said first member toward said stroke limiting member, said stop members having different effective lengths in relation to said limiting element differing by said increment, any one of said stop members normally holding said first member and, when released with one or more of the remaining stop members, allowing said first member to move an extent determined by the unreleased stop member having the longest effective length; and means for selectively releasing said stop members, one or more at a time, beginning with those stop members having the longest effective lengths, including a common operating member and a row of release elements, each representing a different extent of spacing and releasing a different number of said stop members, and means for selectively rendering said release elements operable by the common operating member.

28. In a variable spacing mechanism, a member movable in a character spacing direction and having a series of stop elements disposed on said member at regular intervals, each interval being a multiple of a basic space increment, a fixed stop, a series of space controlling members equal to the number of increments in the interval and shaped to have progressively increasing limited movements by said first member, through engagement with said stop elements, toward said fixed stop; and means for releasing varying numbers of said space controlling members in rotation, beginning with the members having the shortest movement, according to the number of increments of spacing required, said releasing means including a series of release elements representing a plurality of the increments in said interval and disposed different distances from said stop, said controlling members being progressively moved into the influence of said release elements by progressive space movements of the first member.

29. In a variable spacing mechanism, an escapement rack movable in a character spacing direction, said rack having teeth spaced apart at uniform intervals, each interval being a multiple of a minimum increment of spacing; a series of spacing pawls coacting with said teeth, equal in number to the number of units in said interval, said pawls being movable by said rack different extents differing by whole units of spacing; and means for disengaging one or more of said pawls at a time from said rack in rotation to enable the rack to move the desired number of units of spacing, said means including a series of operating members representing different extents of spacing into the influence of which said pawls are successively moved by said rack.

30. In a variable spacing mechanism, a rack having its teeth spaced apart at uniform intervals, each interval being a fixed multiple of a minimum degree of spacing; a series of escapement pawls coacting with said rack, each pawl being independently slidable an extent sufficient to permit escapement of said rack one whole interval if all of said pawls are released while one of them is engaging a tooth in said rack, said pawls being slidably mounted different distances from the ends coacting with said rack and said distances differing by whole units of spacing whereby said rack will be permitted to move a number of units of spacing determined by the pawl unreleased from said rack which moves the shortest distance, and means for releasing said pawls from said rack including a series of release members representing said different distances, each release member when operated releasing all of the pawls which move the shortest distances to enable the pawl which moves the distance corresponding to the operated member to move said corresponding distance.

31. In a variable spacing mechanism, a rack movable in a character spacing direction and having a series of teeth disposed at regular intervals, each interval being divided into a fixed number of units of spacing; a series of space controlling pawls equal in number to the number of units in said interval, mounting means for said pawls enabling said rack to move said pawls in a character spacing direction, including means for limiting the strokes of said pawls by said rack to progressively increasing distances differing by one unit of said interval; and a selector device for releasing one or more of said pawls from said rack selectively in rotation, including a series of release members representing different extents of spacing and disposed transversely of said pawls so as to each be capable of releasing any of said pawls, said pawls being progressively moved into the operating paths of different ones of said release members by progressive spacing movements of said rack.

32. In a variable spacing mechanism, a rack having its teeth spaced at regular intervals, each interval being divided into a fixed number of units of spacing, a series of space controlling pawls equal in number to the number of units in said interval and engaging the teeth in said rack, any one of said pawls normally engaging one of said teeth, said pawls being mounted for movement by said rack in a character spacing direction extents differing by whole units of said interval, said pawls being selectively releasable from said rack in one or more combinations in rotation to enable the rack to move an extent determined by one of the remaining pawls; and means for selectively releasing said pawls from said rack including means operable at any one of a series of space representing positions and capable of releasing any of said pawls, said pawls being progressively moved past said positions by said rack so as to bring different ones of said pawls into different ones of said positions.

33. In a variable spacing mechanism, a rack having teeth located at equally spaced intervals, each interval representing a plurality of space increments, and movable in a character spacing direction; a series of space controlling pawls movable with said rack, each pawl normally engaging one of said teeth; means for limiting the movement of said pawls to progressively increasing distances which are a multiple of a unit of spacing, one of said pawls normally holding said rack against movement and, when released, allowing the rack to move an extent determined by the pawl having the next shortest extent of movement which remains in engagement with a tooth in said rack; and means for releasing said one pawl and one or more of the others to control the extent of movement of the rack, including a series of space representing release members arranged in a definite sequence whereby the lowest release member in the sequence releases said one pawl and successive members in said sequence release the pawls in a corresponding sequence according to the extents said pawls have been moved by said rack.

34. In a variable spacing mechanism, a rack movable in a character spacing direction and having its teeth spaced at regular intervals, each interval being a multiple of a fixed increment of spacing, a fixed stroke limiting element; a series of space controlling pawls engaging the teeth on said rack and movable by said rack toward said stroke limiting element, said pawls having different effective lengths in relation to said limiting element differing by said increment, any one of said pawls normally holding said rack and, when released with one or more of the remaining pawls, allowing said rack to move an extent determined by the unreleased pawl having the shortest effective length, back-spacing mechanism, and means actuated with said back-space mechanism for moving said pawls in a character spacing direction until arrested by said stroke limiting element.

35. In a variable spacing mechanism, a rack movable in a character spacing direction and having teeth disposed at regular intervals, each interval being a multiple of a basic space increment, a fixed stop, a series of space controlling pawls equal to the number of increments in the interval and shaped to have progressively increasing limited movements by said first member toward said fixed stop, back-spacing mechanism, and means actuated with said back-spacing mechanism for moving all of said pawls in character spacing direction against said stop.

36. In a variable spacing mechanism, an escapement rack having teeth disposed at regular intervals, each interval being divided into a plurality of space increments considerably smaller than the spacing of said teeth; a series of spacing pawls all normally engaging the teeth of said rack and having slots for slidably mounting said pawls for movement in a character spacing direction by said rack, the ends of said slots being disposed different distances from the tooth engaging portions of said pawls and said distances differing by whole increments of spacing; a pivot extending through said slots and operative to limit sliding movement of the pawls to an extent determined by the lengths of the slots, any one of said pawls normally holding the rack against motion in a character spacing direction by engagement of the end of its slot with said stop pivot with the ends of the slots in the remaining pawls arrayed different distances from said pivot whereby the release of said one pawl will allow the rack to move in a letter spacing direction an extent determined by the pawl having the end of its slot nearest said pivot, the slots in said pawls being of such length that, when a pawl holding said rack is released, it engages the next succeeding tooth on said rack in a position to allow the maximum movement of said rack when the remaining pawls are released, said slots, when different numbers of pawls are released, permitting the rack to move proportionally different distances according to the number of pawls released, said pawls when released from one tooth engaging the next succeeding tooth whereby the pawls having their slots proportionally nearest the pivot and controlling shorter spacing automatically are aligned by said next succeeding tooth to control longer spacing; back-spacing mechanism, and means actuated concurrently with the back-spacing mechanism for moving all of said pawls in a character spacing direction until stopped by said pivot.

37. In a variable spacing mechanism, an escapement rack movable in a character spacing direction; a series of spacing pawls of graduated lengths representing different fractions of the interval between the teeth on the rack, said pawls normally travelling with said rack in a character spacing direction until disengaged therefrom; stop means for limiting the stroke of any pawl to less than one tooth interval, said stop means normally engaging any one of said pawls to hold said rack against movement in a character spacing direction, the teeth defining said intervals aligning the remaining pawls so as to permit movement of the rack progressively increasing fractions of a tooth interval according to the number of pawls released, including the one engaging said stop means, back-spacing mechanism, and means acting concurrently with the back-spacing mechanism to position said pawls at the end of their limit of movement in a character spacing direction.

38. In a variable spacing mechanism, a member movable in a character spacing direction and having stop elements spaced at regular intervals equal to the maximum width of a character, a fixed stop; a series of space controlling stop members normally engaging said stop elements and movable with said member in a character spacing direction toward said fixed stop until arrested thereby, said stop members having different effective lengths with reference to said fixed stop so that only one of said stop members at a time may be arrested by said fixed stop and hold said first member against movement in a character spacing direction, said one stop member, when released, permitting said movable member to move an extent permitted by that remaining stop member which has the next shortest possible movement permitted by its position in relation to said fixed stop; movable means for selectively releasing one or more of said stop members, beginning with the one holding the movable member and ending with the one having the next shortest permissible movement to the one having the desired degree of freedom, a case shiftable part, and means connected to said case shiftable part for moving the releasing means to a position to increase the selective effect of the releasing means.

39. In combination, a member actuated in a character spacing direction and having stop portions at regular intervals, each interval being subdivided into a plurality of character spacing units; a series of spacing control elements normally engaging said stop portions and corresponding to subdivisions of one interval, means for operating said control elements selectively to space said first member different subdivisions of said interval, tabulating mechanism including means to release all of said spacing control elements from said stop portions as a preliminary to a tabulating movement of said first member; means operative when said spacing control elements are released, to shift said spacing control elements to positions in which the parts of the control elements which engage said stop portions are aligned in two groups spaced half an interval apart in the direction of character spacing movement, a control member movable by said first member in a character spacing direction, and means rendered ineffective by the movement of said control member for holding said spacing control elements in shifted positions.

40. In combination, a member actuated in a character spacing direction and having stop portions at regular intervals, each interval being subdivided into a plurality of character spacing units; a series of spacing control elements normally engaging said stop portions and corresponding to the subdivisions of one interval, means for operating said control elements selectively to space said first member different subdivisions of said interval, tabulating mechanism including means to release all of said spacing control elements from said stop portions as a preliminary to a tabulating movement of said first member; means rendered effective by said tabulating mechanism for positioning said spacing control elements in a plurality of groups to define a plurality of intermediate stopping positions of said first member closer in spacing than said intervals but fewer per interval than said subdivisions, and means activated by the movement of the first member for rendering the positioning means ineffective.

41. In combination, a member actuated in a character spacing direction and having stop portions at regular intervals, each interval being subdivided into a plurality of character spacing units; a series of spacing control elements normally engaging said stop portions and corresponding to the subdivisions of one interval, means for operating said control elements selectively to space said first member different subdivisions of said interval, tabulating mechanism including means to release all of said spacing control elements from said stop portions as a preliminary to a tabulating movement of said first member; a shuttle member having a movement in, and counter to, a character spacing direction during progressive spacing operations of the first member; aligning means rendered operative with each operation of the tabulating mechanism to set said spacing control members in a plurality of groupings separated in a character spacing sense by shorter intervals than said first intervals to define a plurality of intermediate stopping positions of said first member, and means released by movement of the shuttle member in character spacing direction for holding the aligning means in operative position.

42. In combination, a variable spacing mechanism including a coarse pitch rack and a series of spacing pawls corresponding to subdivisions of said pitch, a tabulating mechanism, and means actuated by said tabulating mechanism for moving said pawls into positions to arrest said rack at finer pitch intervals at the end of tabulating operations.

43. In combination, a variable spacing mechanism including a coarse pitch rack and a series of spacing pawls corresponding to subdivisions of said pitch, carriage return mechanism, and means actuated by said carriage return mechanism for moving said pawls into positions to enable said rack to be positioned at finer pitch intervals at the end of carriage return operations.

44. In combination, a variable spacing mechanism including a coarse pitch rack and a series of spacing pawls corresponding to subdivisions of said pitch, a tabulating mechanism, means actuated by the tabulating mechanism for releasing said pawls from said rack, means for holding said pawls in released condition, means actuated by the tabulating mechanism for positioning said pawls in groups at a plurality of intervals each shorter than said pitch but greater than said subdivisions, and means operative at the end of a tabulating movement of said rack and actuated by movement of said rack for releasing said holding means.

45. In combination, a variable spacing mechanism including a coarse pitch rack and a series of spacing pawls corresponding to subdivisions of said pitch, a carrige return mechanism, means actuated by the carriage return mechanism for releasing said pawls from said rack, means for holding said pawls in released condition, means actuated by the carriage return mechanism for positioning said pawls in groups at a plurality of intervals each shorter than said pitch but greater than said subdivisions, and means operative at the end of a carriage return movement of said rack and actuated by movement of said rack for releasing said holding means.

46. In combination with a member movable in a character spacing direction and having stop projections disposed at regular intervals, each interval being a fixed multiple of a basic unit of spacing; a series of space controlling members normally engaging said stop projections and corresponding in number to a plurality of multiples of said unit; a series of release members fewer in number than said multiples, each release member representing a different one of said multiples and operative to release different numbers of said controlling members according to the multiple represented by such release member, and means for shifting said release members to a position to change the number of controlling members released by each release member.

RONALD D. DODGE.

REFERENCES CITED

The following references are of record in the file of this patent:

UNITED STATES PATENTS

| Number | Name | Date |
|---|---|---|
| 481,309 | Redfield | Aug. 23, 1892 |
| 2,385,035 | Smathers | Sept. 18, 1945 |